United States Patent Office 3,248,395
Patented Apr. 26, 1966

3,248,395
4-AMINO-5,6,7,8-TETRAHYDRO-PYRIDO-[4,3-D]-PYRIMIDINE SUBSTITUTION PRODUCTS
Gerhard Ohnacker, Biberach an der Riss, Germany, assignor, by mesne assignments, to Boehringer Ingelheim G.m.b.H., Ingelheim (Rhine), Germany, a corporation of Germany
No Drawing. Filed Mar. 14, 1963, Ser. No. 265,059
Claims priority, application Germany, Mar. 22, 1962, T 21,813
9 Claims. (Cl. 260—246)

This invention relates to substitution products of 4-amino-5,6,7,8-tetrahydro-pyrido-[4,3-d]-pyrimidines and acid addition salts thereof.

More particularly, the present invention relates to 4-amino-5,6,7,8-tetrahydro-pyrido-[4,3-d]-pyrimidine substitution products of the formula

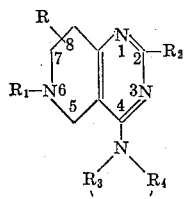

(I)

wherein R is hydrogen, alkyl, aryl or aralkyl, $R_1$ is hydrogen, aryl, aralkyl, acyclic hydrocarbon, amino-substituted acyclic hydrocarbon or alkoxy-substituted acyclic hydrocarbon, $R_2$ is hydrogen, alkyl, aryl, aralkyl, amino, mono-substituted amino, di-substituted amino, saturated basic heterocycle, mercapto, alkyl-mercapto or aralkyl-mercapto, and $R_3$ and $R_4$ are hydrogen, alkyl, amino or, together with each other and the nitrogen atom, form a basic heterocycle, and their non-toxic, pharmacologically acceptable acid addition salts.

The compounds embraced by Formula I above may be prepared by the following methods:

*Method A*.—By reacting a 3-cyano-piperidine of the formula

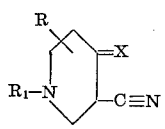

(II)

wherein R and $R_1$ have the same meanings as in Formula I, and X is the oxo group or the imino group, with an amidine of the formula

(III)

wherein $R_2$ has the same meanings as in Formula I, or with an acid addition salt of said amidine, to form a 4-amino-5,6,7,8-tetrahydro-pyrido-[4,3-d]-pyrimidine of the formula

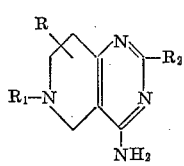

(IV)

wherein R, $R_1$ and $R_2$ have the meanings previously defined, and thereafter, if desired, either alkylating the 4-$NH_2$ group or transforming it into a basic heterocycle, such as pyrrolidino, piperidino, morpholino or piperazino.

The reaction of the 3-cyano-piperidine (II) with the amidine (III) or an acid addition salt thereof is preferably carried out in the presence of an alkaline condensation agent at room temperature or moderately elevated temperatures, and advantageously in the presence of an inert solvent.

Examples of suitable alkaline condensation agents are alkali metal hydroxides, alkali metal carbonates or alkali metal alcoholates.

Examples of suitable inert solvents are water, or organic solvents, such as methanol, ethanol, benzene, tetrahydrofuran and the like.

The subsequent alkylation of the free amino group in the 4-position of Compound IV may be effected in known manner, for instance with the aid of an alkyl halide, a dialkyl sulfate or an alkyl ester of an aromatic sulfonic acid. In the event that it is desired to methylate the free amino group, this may also be accomplished by heating Compound IV with formic acid and formaldehyde.

If it is desired to convert the free amino group of Compound IV into a saturated basic heterocycle, this conversion may also be accomplished in known fashion by reacting Compound IV with an α,ω-dihaloalkane at elevated temperatures.

In those instances where the reaction between the 3-cyano-piperidine (II) and the amidine (III) or the subsequent alkylation or cyclization yields a compound of the Formula I wherein $R_2$ is a free or substituted mercapto group, the $R_2$ substituent may subsequently, if desired, be converted into any of the basic amino groups included in the definition of $R_2$ in conjunction with Formula I by reacting the 2-mercapto compound with ammonia, a primary amine or a secondary amine. This reaction is advantageously performed with a stoichiometric excess of the ammonia or amine and in the presence of an inert organic solvent, such as ethanol, benzene, tetrahydrofuran or the like. The amine reactant, in still greater excess may itself also serve as the solvent medium. The reaction is carried out at a temperature between 20 and 180° C., preferably at the boiling point of the organic solvent or of the amine. In the event that the solvent or the amine has a low boiling point, it is recommended that the reaction be performed in a closed vessel, such as an autoclave.

Thus, compounds of the Formula I wherein $R_2$ is a basic substituent may be prepared by a one-step or a two-step process.

*Method B*.—For preparation of compounds of the Formula I wherein $R_2$ has the meanings defined above except a free or substituted mercapto group, by reacting a tetrahydro-pyrido-[4,3-d]-pyrimidine of the formula

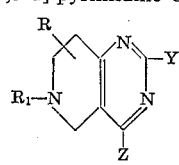

(V)

wherein R and $R_1$ have the same meanings as in Formula I, Y has the same meanings as $R_2$ in Formula I and in addition halogen, and Z is halogen, mercapto or substituted mercapto, with an amine of the formula

(VI)

wherein $R_3$ and $R_4$ have the same meanings as in Formula I. At least one mol of the amine VI is provided per mol of Compound V in this reaction. In the event that Y is also a substituent exchangeable for an amino group, that is, a halogen or a free or substituted mercapto group, at least two mols of the amine VI are required. In either case, however, it is advantageous to provide a molar excess of the amine above and beyond the minimum required.

The reaction between Compound V and the amine VI is advantageously performed in the presence of an inert organic solvent, such as ethanol, benzene, tetrahydrofuran or the like, or in the presence of a substantial excess of the amine VI, at temperatures between 20 and 180° C., preferably at the boiling point of the solvent or of the amine if it itself serves as the solvent. If the solvent or the amine has a low boiling point, it is recommended to work in a closed vessel, for instance in an autoclave.

In those instances where Y in Formula V is a group which is exchangeable for an amino group, the reaction yields compounds of the Formula I wherein $R_2$ and the amino group in the 4-position are identical. If it is desired to prepare compounds of the Formula I wherein $R_2$ and the amino group in the 4-position are different, it is necessary to start with a compound of the Formula V wherein Y is already the desired basic substituent.

The tetrahydro-pyrido-[4,3-d]-pyrimidines V wherein Y and Z are both halogen, which are used as starting materials in Method B, may be prepared by halogenation of the corresponding 2,4-dihydroxy-tetrahydro-pyrido-[4,3-d] - pyrimidines. These 2,4-dihydroxy compounds are either well-known compounds or may readily be prepared by methods analogous to those by which the known compounds are prepared. The halogenation of the 2,4-dihydroxy compounds may be effected by customary methods, but preferably by heating the 2,4-dihydroxy compound with a mixture of phosphorus oxychloride and phosphorus pentachloride.

Compounds of the Formula V wherein Y and Z have the indicated meanings except halogen may be prepared by reacting a 4 - hydroxy - tetrahydro - pyrido - [4,3 - d]-pyrimidine of the formula

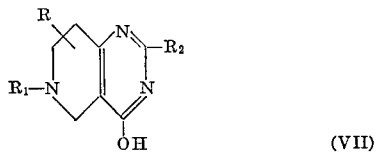

(VII)

wherein R, $R_1$ and $R_2$ have the meanings previously defined in connection with Formula I, with phosphorus pentasulfide in known fashion. The corresponding 4-mercapto compound obtained thereby may subsequently, if desired, be alkylated in accordance with known methods. In this manner, therefore, it is possible to obtain 4-mercapto- and 2,4 - dimercapto - 5,6,7,8 - tetrahydro - pyrido - [4,3 - d]-pyrimidines.

Compounds of the Formula V, wherein Z is halogen and Y is hydrogen, lower alkyl, aryl, aralkyl or any one of basic substituents defined in connection with Formula V may be prepared from compounds of the Formula VII wherein R and $R_1$ have the meanings previously defined and $R_2$ is hydrogen, lower alkyl, aryl, aralkyl or any of the basic substituents, by halogenation in accordance with known methods, preferably with a mixture of phosphorus oxychloride and phosphorus pentachloride.

The 4-hydroxy compounds of the Formula VII may themselves be prepared by the methods described in my copending applications, Serial No. 265,084 (now U.S. Patent No. 3,186,991), entitled "5,6,7,8 - Tetrahydro-Pyrido-[4,3-d]-Pyrimidines," and Serial No. 265,051, "4-Hydroxy - 5,6,7,8 - Tetrahydro - Pyrido - [4,3-d] - Pyrimidine Substitution Products," filed on even date herewith.

The starting materials for method A may readily be prepared in analogous fashion to known processes. The 3-cyano-piperidine-compounds of the Formula II above, wherein X means the imino group, may be prepared from the corresponding bis($\beta$-cyano-ethyl)-amines by Thorpe-Ziegler cyclisation. The compounds of the Formula II above, wherein X means the oxo group, may be prepared by hydrolysis of the above mentioned 3-cyano-4-imino-piperidines with aqueous 25% hydrochloric acid.

A particularly advantageous embodiment of Method A consists of using as a starting material not the isolated 3-cyano-piperidine of the Formula II, wherein X means the imino group, but instead the reaction mass resulting from the cyclisation.

The basic end products of the Formula I which are obtained by Methods A and B may, if desired, be transformed into their acid addition salts by methods customarily employed for the preparation of acid addition salts of basic organic compounds, for instance by dissolving the free base in a suitable solvent and acidifying the solution with the desired inorganic or organic acid. If the basic compound of the Formula I contains more than one basic nitrogen atom, acid addition salts with more than one equivalent of acid may be obtained.

The following examples illustrate certain representative compounds according to the present invention and enable others skilled in the art to understand my invention more completely. It should be understood, however, that my invention is not limited solely to these illustrative examples.

EXAMPLE 1

*Preparation of 2,6,8-trimethyl-4-amino-5,6,7,8-tetrahydro-pyrido-[4,3-d]-pyrimidine by Method B*

A mixture of 5.5 gm. of raw 2,6,8-trimethyl-4-chloro-5,6,7,8-tetrahydro-pyrido-[4,3-d]-pyrimidine and 100 cc. of a methanolic 14% solution of ammonia was heated at 100° C. for 24 hours in an autoclave made of $V_4A$-stainless steel. Thereafter, the methanol was evaporated in vacuo, and the residue was taken up in water. The resulting aqueous solution was repeatedly extracted with chloroform, the chloroform extract solutions were combined, dried over sodium sulfate, and the chloroform was evaporated. The residue was recrystallized from ethyl acetate, yielding 2 gm. of the compound of the formula

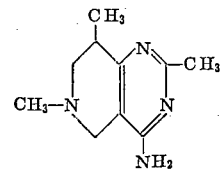

having a melting point of 186–187° C.

EXAMPLE 2

*Preparation of 2-benzyl-4-morpholino-6,8-dimethyl-5,6,7,8-tetrahydro-pyrido-[4,3-d]-pyrimidine by Method B*

A mixture of 8 gm. of 2-benzyl-4-chloro-6,8-dimethyl-5,6,7,8-tetrahydro-pyrido-[4,3-d]-pyrimidine (M.P. 68–69° C. from methanol) and 13 gm. of morpholine was refluxed for 22 hours. Thereafter, the unreacted excess of morpholine was evaporated in vacuo, the residue was taken up in water, and the aqueous solution was extracted three times with ether. The ether extract solutions were combined and the ether was evaporated. A tacky, viscous residue remained, which crystallized upon scratching. The crystalline product was recrystallized from an aqueous 50% solution of ethanol, yielding 5 gm. of the compound of the formula

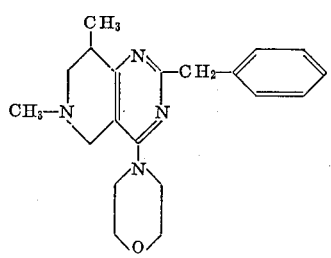

having a melting point of 93–94° C.

EXAMPLE 3

Using a procedure analogous to that described in Example 1, 2-phenyl-4-amino-6-(γ-dimethylamino-n-propyl)-5,6,7,8-tetrahydro-pyrido-[4,3-d]-pyrimidine of the formula

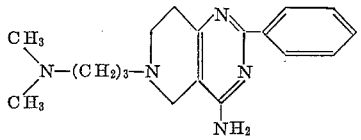

having a melting point of 135–136° C. was prepared from 2-phenyl-4-chloro-6-(γ-dimethylamino-n-propyl)-5,6,7,8-tetrahydro-pyrido-[4,3-d]-pyrimidine and ammonia.

EXAMPLE 4

Using a procedure analogous to that described in Example 1, 2-phenyl-4-amino-6-(β-diethylamino-ethyl)-5,6,7,8-tetrahydro-pyrido-[4,3-d]-pyrimidine of the formula

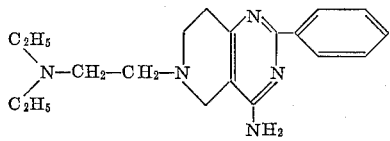

having a melting point of 131–133° C. was prepared from 2-phenyl-4-chloro-6-(β-diethylamino-ethyl)-5,6,7,8-tetrahydro-[4,3-d]-pyrimidine and ammonia.

EXAMPLE 5

Using a procedure analogous to that described in Example 1, 2-phenyl-4-amino-6-(γ-diethylamino-n-propyl)-5,6,7,8-tetrahydro-pyrido-[4,3-d]-pyrimidine of the formula

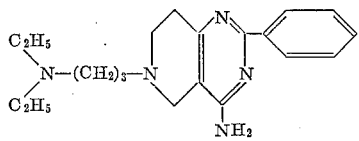

having a melting point of 117–118° C. was prepared from 2-phenyl-4-chloro-6-(γ-diethylamino-n-propyl)-5,6,7,8-tetrahydro-pyrido-[4,3-d]-pyrimidine and ammonia.

EXAMPLE 6

Using a procedure analogous to that described in Example 2, 2-phenyl-4-morpholino-6-benzyl-8-methyl-5,6,7,8-tetrahydro-pyrido-[4,3-d]-pyrimidine of the formula

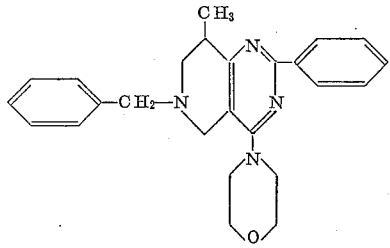

having a melting point of 114–115° C. was prepared from 2-phenyl-4-chloro-6-benzyl-8-methyl-5,6,7,8-tetrahydro-pyrido-[4,3-d]-pyrimidine and morpholine. The oxalate of the free base had a melting point of 145° C.

EXAMPLE 7

Using a procedure analogous to that described in Example 2, 2-(N'-methyl-piperazino)-4-hydrazino-6-benzyl-5,6,7,8-tetrahydro-pyrido-[4,3-d]-pyrimidine of the formula

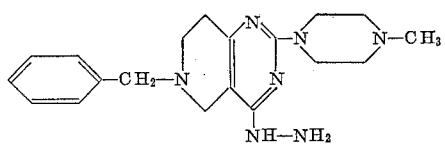

having a melting point of 236–237° C. was prepared from 2-(N'-methyl-piperazino)-4-chloro-6-benzyl-5,6,7,8-tetrahydro-pyrido-[4,3-d]-pyridine and hydrazine.

EXAMPLE 8

Using a procedure analogous to that described in Example 2, 2-(N'-methyl-piperazino)-4-n-hexylamino-6-benzyl-5,6,7,8-tetrahydro-pyrido-[4,3-d]-pyrimidine of the formula

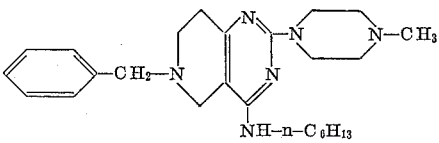

having a melting point of 75–76° C. was prepared from 2-(N'-methyl-piperazino)-4-chloro-6-benzyl-5,6,7,8-tetrahydro-pyrido-[4,3-d]-pyrimidine and n-hexylamine.

EXAMPLE 9

Using a procedure analogous to that described in Example 2, 2-(N'-methyl-piperazino)-4-n-hexylamino-6-(β-phenyl-ethyl)-5,6,7,8-tetrahydro-pyrido-[4,3-d]-pyrimidine of the formula

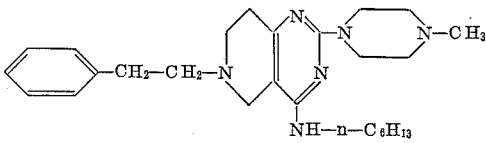

having a melting point of 147–148° C. was prepared from 2-(N'-methyl-piperazino)-4-chloro-6-(β-phenyl-ethyl)-5,6,7,8-tetrahydro-pyrido-[4,3-d]-pyrimidine and n-hexylamine.

EXAMPLE 10

Using a procedure analogous to that described in Example 2, 2-morpholino-4-pyrrolidino-6-methyl-5,6,7,8-tetrahydro-pyrido-[4,3-d]-pyrimidine of the formula

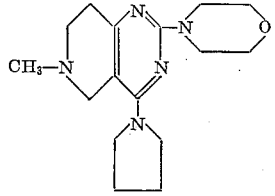

having a melting point of 137° C. was prepared from 2-morpholino-4-chloro-6-methyl-5,6,7,8-tetrahydro-pyrido-[4,3-d]-pyrimidine and pyrrolidine.

EXAMPLE 11

Using a procedure analogous to that described in Example 2,2-(N-methyl-piperazino)-pyrrolidino-6-n-propyl-5,6,7,8-tetrahydro-pyrido-[4,3-d]pyrimidine of the formula

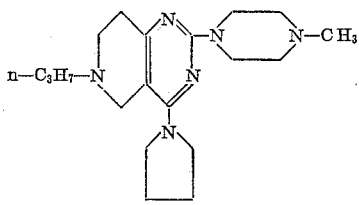

having a melting point of 99–102° C. was prepared from 2-(N'-methyl-piperazino)-4-chloro-6-n-propyl-5,6,7,8-tetrahydro-pyrido-[4,3-d]-pyrimidine and pyrrolidine.

EXAMPLE 12

Using a procedure analogous to that described in Example 2,2,4 - dipyrrolidino-6-n-propyl-5,6,7,8-tetrahydro-pyrido-[4,3-d]-pyrimidine of the formula

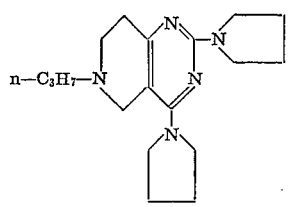

having a melting point of 88–90° C. was prepared from 2 - pyrrolidino - 4 - chloro-6-n-propyl-5,6,7,8-tetrahydro-pyrido-[4,3-d]-pyrimidine and pyrrolidine.

EXAMPLE 13

Using a procedure analogous to that described in Example 2,2-piperidino - 4 - pyrrolidino - 6 - n - propyl-5,6,7,8-tetrahydro-pyrido-[4,3-d]-pyrimidine of the formula

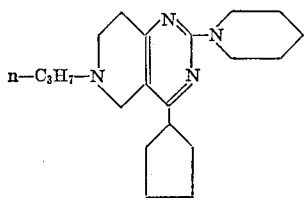

having a melting point of 78–80° C. was prepared from 2-piperidino-4-chloro-6-n-propyl-5,6,7,8 - tetrahydro - pyrido-[4,3-d]pyrimidine and pyrrolidine.

EXAMPLE 14

Using a procedure analogous to that described in Ex-2,2 - morpholino - 4-pyrrolidino-6-n-propyl-5,6,7,8-tetrahydro-pyrido-[4,3-d]-pyrimidine of the formula

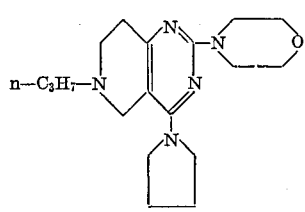

having a melting point of 99–102° C. was prepared from 2 - morpholino - 4 - chloro - 6 - n-propyl-5,6,7,8-tetrahydro-pyrido-[4,3-d]-pyrimidine and pyrrolidine.

EXAMPLE 15

Using a procedure analogous to that described in Example 2,2-n-hexylamino - 4 - pyrrolidino - 6 - n - butyl-5,6,7,8-tetrahydro-pyrido-[4,3-d]-pyrimidine of the formula

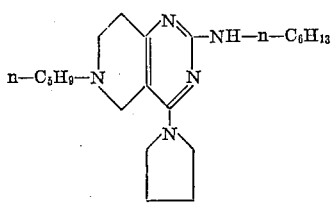

having a melting point of 80° C. was prepared from 2-n-hexyl - amino - 4 - chloro -6- n-butyl-5,6,7,8-tetrahydro-pyrido-[4,3-d]-pyrimidine and pyrrolidine.

EXAMPLE 16

Using a procedure analogous to that described in Ex-2,2 - (N' - methyl - piperazino) - 4 - pyrrolidino - 6 - n - butyl-5,6,7,8-tetrahydro-pyrido-[4,3-d]-pyrimidine of the formula

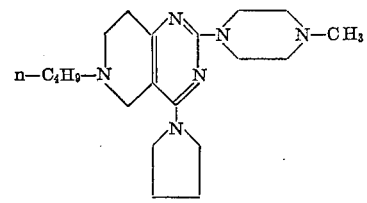

having a melting point of 87° C. was prepared from 2- (N' - methyl - piperazino) - 4 - chloro-6-n-butyl-5,6,7,8-tetrahydro-pyrido-[4,3-d]-pyrimidine and pyrrolidine.

EXAMPLE 17

Using a procedure analogous to that described in Example 2,2,4 - dipyrrolidino - 6-n-butyl-5,6,7,8-tetrahydro-pyrido-[4,3-d]-pyrimidine of the formula

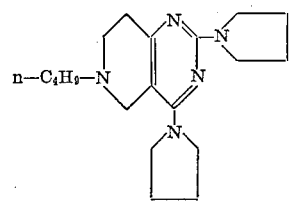

having a melting point of 78° C. was prepared from 2-pyrrolidino - 4 - chloro-6-n-butyl-5,6,7,8-tetrahydro-pyrido-[4,3-d]-pyrimidine and pyrrolidine.

EXAMPLE 18

Using a procedure analogous to that described in Example 2,2 - n-hexylamino-4-pyrrolidino-6-isobutyl-5,6,7,8-tetrahydro-pyrido-[4,3-d]-pyrimidine of the formula

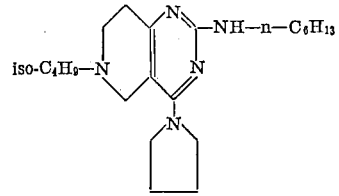

having a melting point of 101–102° C. was prepared from 2 - n - hexylamino-4-chloro-6-isobutyl-5,6,7,8-tetrahydro-pyrido-[4,3-d]-pyrimidine and pyrrolidine.

EXAMPLE 19

Using a procedure analogous to that described in Example 2,2 - (di - n - butylamino) - 4 - pyrrolidino - 6 - iso-butyl-5,6,7,8-tetrahydro-pyrido-[4,3-d]-pyrimidine of the formula

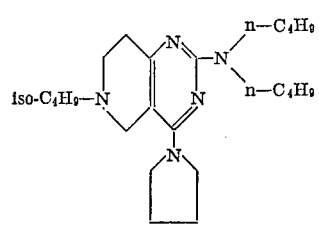

having a melting point of 49–50° C. was prepared from 2 - (di - n - butylamino) - 4 - chloro - 6 - isobutyl-5,6,7,8-tetrahydro-pyrido-[4,3-d]pyrimidine and pyrrolidine.

EXAMPLE 20

Using a procedure analogous to that described in Example 2,2 - (N' - methyl - piperazino) - 4 - pyrrolidino-6- isobutyl - 5,6,7,8-tetrahydro-pyrido-[4,3-d]-pyrimidine of the formula

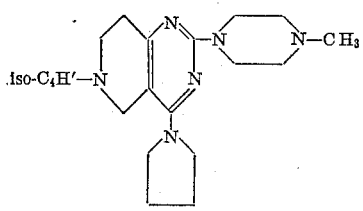

having a melting point of 112–114° C. was prepared from 2-(N'-methyl-piperazino)-4-chloro-6-isobutyl-5,6,7,8-tetrahydro-pyrido-[4,3-d]-pyrimidine and pyrrolidine.

EXAMPLE 21

Using a procedure analogous to that described in Example 2, 2,4-dipyrrolidino-6-isobutyl-5,6,7,8-tetrahydro-pyrido-[4,3-d]-pyrimidine of the formula

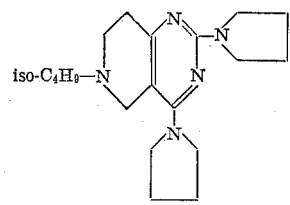

having a melting point of 96° C. was prepared from 2-pyrrolidino-4-chloro-6-isobutyl-5,6,7,8-tetrahydro - pyrido-[4,3-d]-pyrimidine and pyrrolidine.

EXAMPLE 22

Using a procedure analogous to that described in Example 2, 2-piperidino-4-pyrrolidino-6-isobutyl-5,6,7,8-tetrahydro-pyrido-[4,3-d]-pyrimidine of the formula

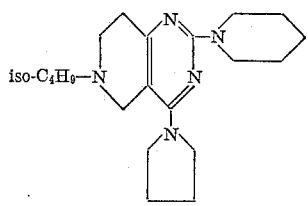

having a melting point of 116° C. was prepared from 2-piperidino - 4 - chloro-6-isobutyl-5,6,7,8-tetrahydro-pyrido-[4,3-d]-pyrimidine and pyrrolidine.

EXAMPLE 23

Using a procedure analogous to that described in Example 2, 2-morpholino-4-pyrrolidino-6-isobutyl-5,6,7,8-tetrahydro-pyrido-[4,3-d]-pyrimidine of the formula

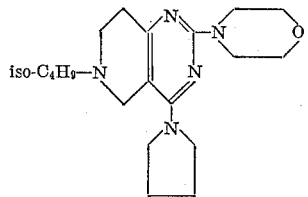

having a melting point of 120–121° C. was prepared from 2-morpholino-4-chloro - 6-isobutyl - 5,6,7,8-tetrahydro-pyrido- [4,3-d]-pyrimidine and pyrrolidine.

EXAMPLE 24

Using a procedure analogous to that described in Example 2, 2-(N'-methyl-piperazino) - 4-pyrrolidino-6-phenyl-5,6,7,8-tetrahydro - pyrido-[4,3-d] - pyrimidine of the formula

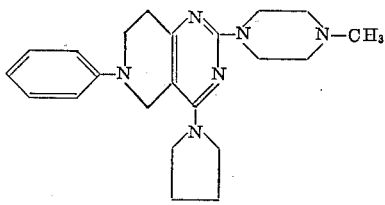

having a melting point of 112–113° C. was prepared from 2-(N'-methyl - piperazino)-4-chloro-6-phenyl - 5,6,7,8-tetrahydro-pyrido-[4,3-d]-pyrimidine and pyrrolidine.

EXAMPLE 25

Using a procedure analogous to that described in Example 2, 2-morpholino-4-pyrrolodino-6-phenyl-5,6,7,8 tetrahydro-pyrido-[4,3-d]-pyrimidine of the formula

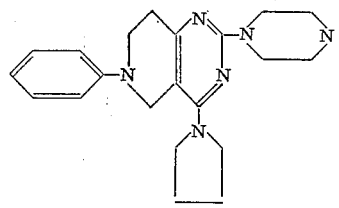

having a melting point of 153° C. was prepared from 2-morpholino-4-chloro-6-phenyl-5,6,7,8-tetrahydro - pyrido-[4,3-d]-pyrimidine and pyrrolidine.

EXAMPLE 26

Using a procedure analogous to that described in Example 2, 2-(di-n-butylamino)-4-pyrrolidino-6-benzyl-5,6,7,8-tetrahydro-pyrido-[4,3-d]-pyrimidine of the formula

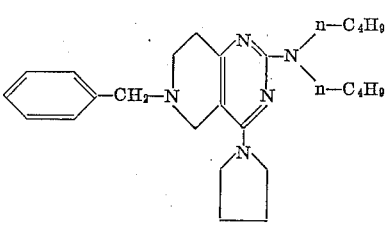

having a melting point of 72–73° C. was prepared from 2-(di-n-butylamino)-4-chloro-6-benzyl - 5,6,7,8 - tetrahydro-pyrido-[4,3-d]-pyrimidine and pyrrolidine.

EXAMPLE 27

Using a procedure analogous to that described in Example 2, 2-anilino-4-pyrrolidino-6-benzyl-5,6,7,8-tetrahydro-pyrido-[4,3-d]-pyrimidine of the formula

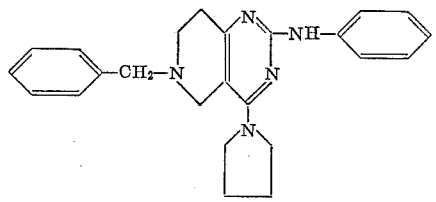

having a melting point of 178–179° C. was prepared from 2-anilino-4-chloro-6-benzyl-5,6,7,8-tetrahydro - pyrido-[4,3-d]-pyrimidine and pyrrolidine.

EXAMPLE 28

Using a procedure analogous to that described in Example 2, 2-(N'-methyl-piperazino)-4-pyrrolidino-6-benzyl-5,6,7,8-tetrahydro-pyrido-[4,3-d]-pyrimidine of the formula

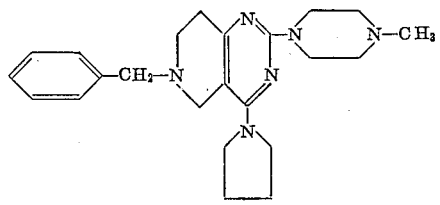

having a melting point of 154° C. was prepared from 2-(N'-methyl-piperazine)-4-chloro-6-benzyl - 5,6,7,8-tetrahydro-pyrido-[4,3-d]-pyrimidine and pyrrolidine.

EXAMPLE 29

Using a procedure analogous to that described in Example 2, 2,4-dipyrrolidino-6-benzyl-5,6,7,8-tetrahydro-pyrido-[4,3-d]-pyrimidine of the formula

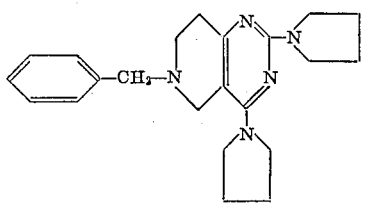

having a melting point of 135–137° C. was prepared from 2 - pyrrolidino-4-chloro-6-benzyl-5,6,7,8-tetrahydro-pyrido-[4,3-d]-pyrimidine and pyrrolidine.

EXAMPLE 30

Using a procedure analogous to that described in Example 2, 2 - morpholino - 4-piperidino-6-methyl-5,6,7,8-tetrahydro-pyrido-[4,3-d]-pyrimidine of the formula

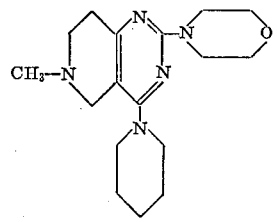

having a melting point of 119° C. was prepared from 2 - morpholino - 4 - chloro-6-methyl-5,6,7,8-tetrahydro-pyrido-[4,3-d]pyrimidine and piperidine.

EXAMPLE 31

Using a procedure analogous to that described in Example 2, 2,4 - dipiperidino - 6-ethyl-5,6,7,8-tetrahydro-pyrido-[4,3-d]-pyrimidine of the formula

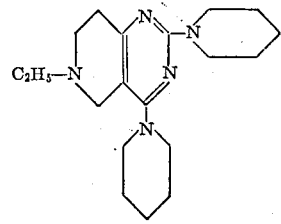

having a melting point of 87–89° C. was prepared from 2 - piperidino - 4 - chloro - 6-ethyl-5,6,7,8-tetrahydro-pyrido-[4,3-d]-pyrimidine and piperidine.

EXAMPLE 32

Using a procedure analogous to that described in Example 2, 2 - morpholino - 4 - piperidino-6-ethyl-5,6,7,8-tetrahydro-pyrido-[4,3-d]-pyrimidine of the formula

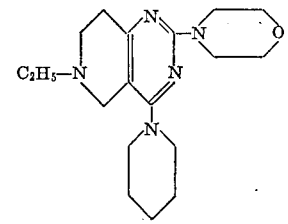

having a melting point of 104° C. was prepared from 2 - morpholino - 4 - chloro - 6-ethyl-5,6,7,8-tetrahydro-pyrido-[4,3-d]-pyrimidine and piperidine.

EXAMPLE 33

Using a procedure analogous to that described in Example 2, 2 - (N' - methyl-piperazino)-4-piperidino-6-n-propyl - 5,6,7,8 - tetrahydro-pyrido-[4,3-d]-pyrimidine of the formula

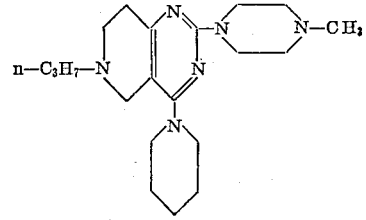

having a melting point of 122–124° C. was prepared from 2 - (N' - methyl - piperazino)-4-chloro-6-n-propyl-5,6,7,8-tetrahydro-pyrido-[4,3-d]-pyrimidine and piperidine.

EXAMPLE 34

Using a procedure analogous to that described in Example 2, 2 - pyrrolidino - 4-piperidino-6-n-propyl-5,6,7,8-tetrahydro-pyrido-[4,3-d]-pyrimidine of the formula

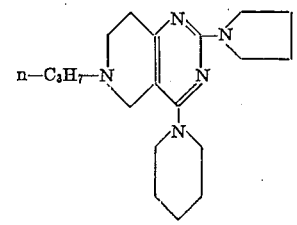

having a melting point of 84–87° C. was prepared from 2 - pyrrolidino - 4 - chloro-6-n-propyl-5,6,7,8-tetrahydro-pyrido-[4,3-d]-pyrimidine and piperidine.

EXAMPLE 35

Using a procedure analogous to that described in Example 2, 2,4-dipiperidino - 6 - n-propyl-5,6,7,8-tetrahydro-pyrido-[4,3-d]-pyrimidine of the formula

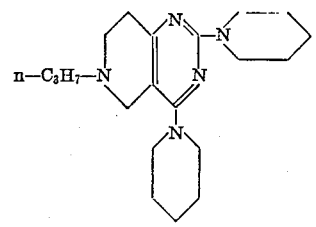

having a melting point of 100–102° C. was prepared from 2 - piperidino - 4 - chloro - 6-n-propyl-5,6,7,8-tetrahydro-pyrido-[4,3-]-pyrimidine and piperidine.

EXAMPLE 36

Using a procedure analogous to that described in Example 2, 2 - morpholino - 4-piperidino-6-n-propyl-5,6,7,8-tetrahydro-pyrido-[4,3-d]-pyrimidine of the formula

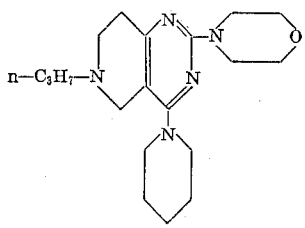

having a melting point of 101–102° C. was prepared from 2 - morpholino - 4 - chloro - 6-n-propyl-5,6,7,8-tetrahydro-pyrido-[4,3-d]-pyrimidine and piperidine.

EXAMPLE 37

Using a procedure analogous to that described in Example 2, 2 - (N' - methyl-piperazino)-4-piperidino-6-n-butyl-5,6,7,8,-tetrahydro-pyrido[4,3-d]-pyrimidine of the formula

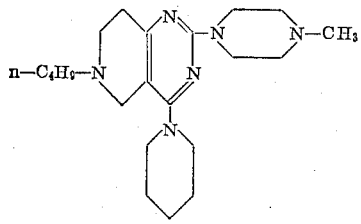

having a melting point of 70–71° C. was prepared from 2 - (N' - methyl - piperazino)-4-chloro-6-n-butyl-5,6,7,8-tetrahydro-pyrido-[4,3-d]-pyrimidine and piperidine.

EXAMPLE 38

Using a procedure analogous to that described in Example 2, 2 - pyrrolidino - 4 - piperidino-6-n-butyl-5,6,7,8-tetrahydro-pyrido-[4,3-d]-pyrimidine of the formula

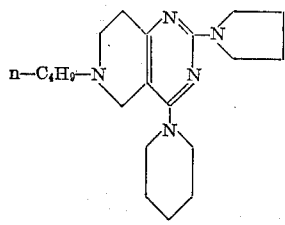

having a melting point of 82° C. was prepared from 2 - pyrrolidino - 4 - chloro-6-n-butyl-5,6,7,8-tetrahydro-pyrido-[4,3-d]-pyrimidine and piperidine.

EXAMPLE 39

Using a procedure analogous to that described in Example 2, 2,4-dipiperidino-6-n-butyl-5,6,7,8-tetrahydropyrido-[4,3-d]-pyrimidine of the formula

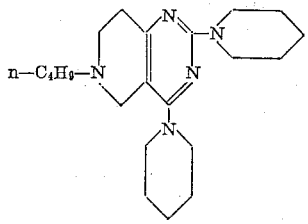

having a melting point of 67–68° C. was prepared from 2-piperidino-4-chloro-6-n-butyl - 5,6,7,8 - tetrahydro-pyrido-[4,3-d]-pyrimidine and piperidine.

EXAMPLE 40

Using a procedure analogous to that described in Example 2, 2-morpholino-4-piperidino-6-n-butyl-5,6,7,8-tetrahydro-pyrido-[4,3-d]-pyrimidine of the formula

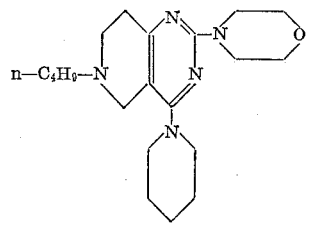

having a melting point of 105° C. was prepared from 2-morpholino-4-chloro-6-n-butyl - 5,6,7,8 - tetrahydro-pyrido-[4,3-d]-pyrimidine and piperidine.

EXAMPLE 41

Using a procedure analogous to that described in Example 2, 2-(N'-methyl-piperazino)-4-piperidino-6-isobutyl-5,6,7,8-tetrahydro-pyrido-[4,3-d]-pyrimidine of the formula

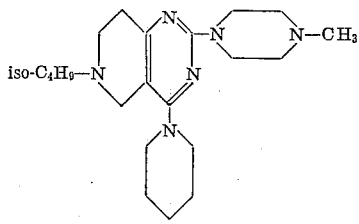

having a melting point of 105–106° C. was prepared from 2-(N'-methyl-piperazino)-4-chloro-6-n-butyl-5,6,7,8-tetrahydro-pyrido-[4,3-d]-pyrimidine and piperidine. The bis-maleinate of the base had a melting point of 187–189° C.

EXAMPLE 42

Using a procedure analogous to that described in Example 2, 2-pyrrolidino-4-piperidino-6-isobutyl-5,6,7,8-tetrahydro-pyrido-[4,3-d]-pyrimidine of the formula

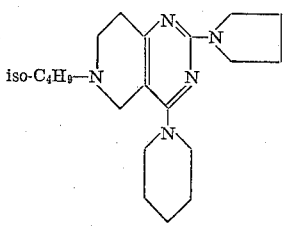

having a melting point of 102–103° C. was prepared from 2-pyrrolidino-4-chloro-6-isobutyl - 5,6,7,8 - tetrahydro-pyrido-[4,3-d]-pyrimidine and piperidine.

EXAMPLE 43

Using a procedure analogous to that described in Example 2, 2-morpholino-4-piperidino-6-isobutyl-5,6,7,8-tetrahydro-pyrido-[4,3-d]-pyrimidine of the formula

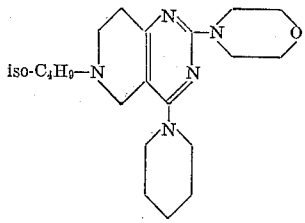

having a melting point of 123° C. was prepared from 2-morpholino - 4 - chloro - 6 - isobutyl - 5,6,7,8-tetrahydro-pyrido-[4,3-d]-pyrimidine and piperidine.

EXAMPLE 44

Using a procedure analogous to that described in Example 2, 2-(N'-methyl-piperazino)-4-piperidino-6-phenyl- 5,6,7,8-tetrahydro-pyrido-[4,3-d]-pyrimidine of the formula

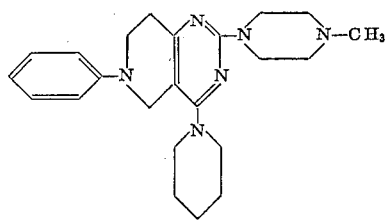

having a melting point of 82° C. was prepared from 2-(N'-methyl - piperazino)-4-piperidino-6-phenyl-5,6,7,8-tetrahydro-pyrido-[4,3-d]-pyrimidine and piperidine.

EXAMPLE 45

Using a procedure analogous to that described in Example 2, 2,4-dipiperidino-6-phenyl-5,6,7,8-tetrahydro-pyrido-[4,3-d]-pyrimidine of the formula

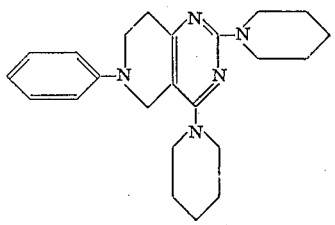

having a melting point of 118° C. was prepared from 2-piperidino-4-chloro-6-phenyl-5,6,7,8 - tetrahydro-pyrido-[4,3-d]-pyrimidine and piperidine.

EXAMPLE 46

Using a procedure analogous to that described in Example 2, 2-morpholino-4-piperidino-6-phenyl-5,6,7,8-tetrahydro-pyrido-[4,3-d]-pyrimidine of the formula

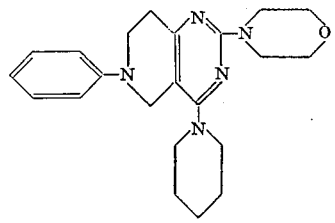

having a melting point of 132° C. was prepared from 2-morpholino-4-chloro-6-phenyl - 5,6,7,8-tetrahydro-pyrido-[4,3-d]-pyrimidine and piperidine.

EXAMPLE 47

Using a procedure analogous to that described in Example 2, 2-anilino-4-piperidino-6-benzyl-5,6,7,8-tetrahydro-pyrido-[4,3-d]-pyrimidine of the formula

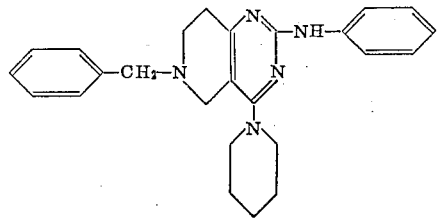

having a melting point of 149–151° C. was prepared from 2-anilino-4-chloro-6-benzyl - 5,6,7,8 - tetrahydro - pyrido-[4,3-d]-pyrimidine and piperidine.

EXAMPLE 48

Using a procedure analogous to that described in Example 2, 2-(N'-methyl-piperazino) - 4 - piperidino - 6 - benzyl-5,6,7,8-tetrahydro-pyrido-[4,3-d]-pyrimidine of the formula

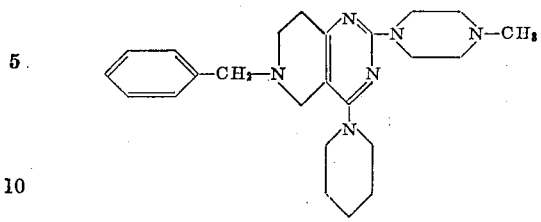

having a melting point of 152° C. was prepared from 2-(N'-methyl-piperazino)-4-chloro-6-benzyl - 5,6,7,8 - tetrahydropyrido-[4,3-d]-pyrimidine and piperidine.

EXAMPLE 49

Using a procedure analogous to that described in Example 2, 2,4-dipiperidino-6-benzyl-5,6,7,8-tetrahydro-pyrido-[4,3-d]-pyrimidine of the formula

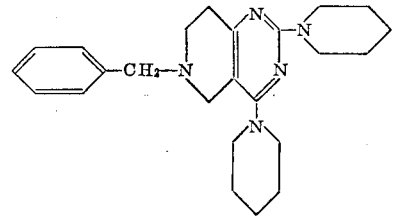

having a melting point of 122–123° C. was prepared from 2-piperidino-4-chloro-6-benzyl - 5,6,7,8 - tetrahydro-pyrido-[4.3-d]-pyrimidine and piperidine.

EXAMPLE 50

Using a procedure analogous to that described in Example 2, 2-morpholino-4-piperidino-6-benzyl-5,6,7,8-tetrahydro-pyrido-[4,3-d]-pyrimidine of the formula

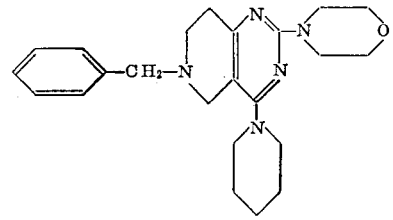

having a melting point of 139° C. was prepared from 2-morpholino-4-chloro-6-benzyl-5,6,7,8-tetrahydro-pyrido-[4,3-d]-pyrimidine and piperidine.

EXAMPLE 51

Using a procedure analogous to that described in Example 2, 2-morpholino-4-piperidino-6-(β-phenyl-ethyl)-5,6,7,8-tetrahydro-pyrido-[4,3-d]-pyrimidine of the formula

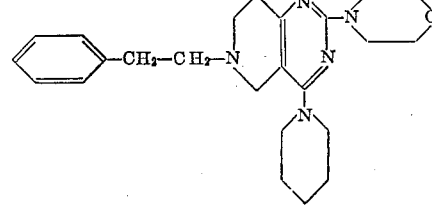

having a melting point of 139° C. was prepared from 2-morpholino-4-chloro-6-(β-phenyl-ethyl) - 5,6,7,8 - tetrahydro-pyrido-[4,3-d]-pyrimidine and piperidine.

EXAMPLE 52

Using a procedure analogous to that described in Example 2, 2-morpholino-4-piperidino-6-(γ-dimethylamino-n- propyl)-5,6,7,8-tetrahydro-pyrido-[4,3,-d]-pyrimidine of the formula

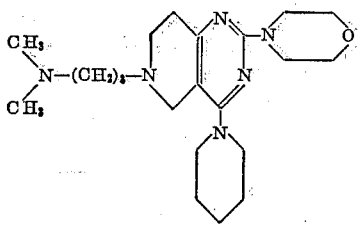

having a melting point of 92–93° C. was prepared from 2-morpholino-4-chloro-6-(γ - dimethylamino - n - propyl)-5,6,7,8-tetrahydro-pyrido - [4,3-d] - pyrimidine and piperidine.

EXAMPLE 53

Using a procedure analogous to that described in Example 2, 2,4-dimorpholino-6-n - propyl - 5,6,7,8 - tetrahydropyrido-[4,3-d]-pyrimidine of the formula

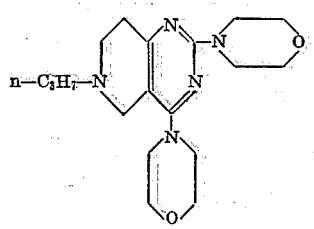

having a melting point of 116–118° C. was prepared from 2-morpholino-4-chloro-6 - n - propyl - 5,6,7,8 - tetrahydropyrido-[4,3-d]-pyrimidine and morpholine.

EXAMPLE 54

Using a procedure analogous to that described in Example 2, 2-piperindino-4-morpholino-6 - isopropyl - 5,6,7,8-tetrahydro-pyrido-[4,3-d]-pyrimidine of the formula

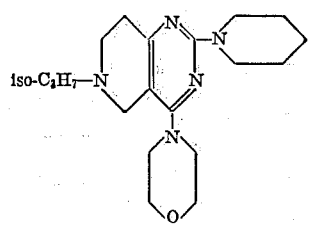

having a melting point of 117–118° C. was prepared from 2-piperidino-4-chloro - 6 - isopropyl - 5,6,7,8 - tetrahydro-pyrido-[4,3-d]-pyrimidine and morpholine.

EXAMPLE 55

Using a procedure analogous to that described in Example 2, 2-(N'-methyl-piperazino)-4-morpholino-6-isobutyl-5,6,7,8-tetrahydro-pyrido-[4,3-d]-pyrimidine of the formula

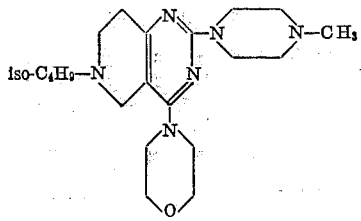

having a melting point of 125–126° C. was prepared from 2-(N'-methyl-piperazino)-4-chloro - 6 - isobutyl - 5,6,7,8-tetrahydro-pyrido-[4,3-d]-pyrimidine and morpholine.

EXAMPLE 56

Using a procedure analogous to that described in Example 2, 2-(N'-methyl-piperazino)-4-morpholino - 6 - benzyl-5,6,7,8-tetrahydro-pyrido-[4,3-d]-pyrimidine of the formula

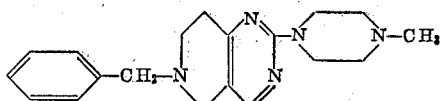

having a melting point of 129° C. was prepared from 2-(N'-methyl-piperazino)-4-chloro-6-benzyl - 5,6,7,8 - tetrahydro-pyrido-[4,3-d]-pyrimidine and morpholine.

EXAMPLE 57

Using a procedure analogous to that described in Example 2, 2-pyrrolidino-4-morpholino-6-benzyl-5,6,7,8-tetrahydro-pyrido-[4,3-d]-pyrimidine of the formula

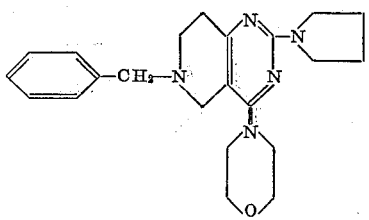

having a melting point of 132–133° C. was prepared from 2 - pyrrolidino - 4 - chloro-6-benzyl - 5,6,7,8 - tetrahydropyrido-[4,3-d]-pyrimidine and morpholine.

EXAMPLE 58

Using a procedure analogous to that described in Example 2, 2-piperidino-4-morpholino-6-benzyl-5,6,7,8-tetrahydro-pyrido-[4,3-d]-pyrimidine of the formula

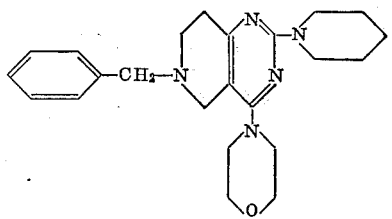

having a melting point of 176° C. was prepared from 2-piperidino-4-chloro-6-benzyl - 5,6,7,8 - tetrahydro-pyrido-[4,3-d]-pyrimidine and morpholine.

EXAMPLE 59

Using a procedure analogous to that described in Example 2, 2,4 - dimorpholino-6-benzyl - 5,6,7,8 - tetrahydropyrido-[4,3-d]-pyrimidine of the formula

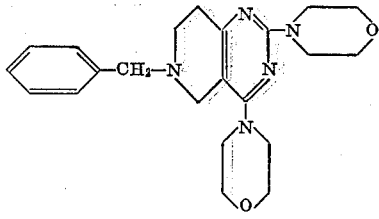

having a melting point of 148° C. was prepared from 2-morpholino-4-chloro-6-benzyl - 5,6,7,8 - tetrahydro-pyrido-[4,3-d]-pyrimidine and morpholine.

EXAMPLE 60

Using a procedure analogous to that described in Example 2, 2,4-bis-(N'-methyl-piperazino) - 6 - n-butyl-5,6,7,8-tetrahydro-pyrido-[4,3-d]-pyrimidine of the formula

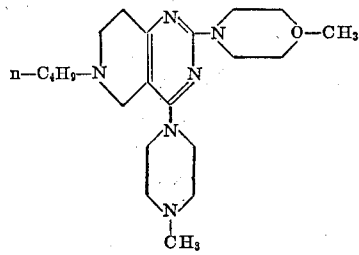

having a melting point of 87–90° C. was prepared from 2-(N'-methyl-piperazino) - 4 - chloro - 6 - n-butyl-5,6,7,8-tetrahydro - pyrido - [4,3 - d] - pyrimidine and N-methyl-piperazine.

EXAMPLE 61

Using a procedure analogous to that described in Example 2, 2-piperidino - 4 - (N'-methyl-piperazino)-6-n-butyl-5,6,7,8-tetrahydro-pyrido-[4,3-d]-pyrimidine of the formula

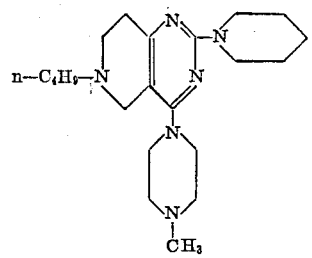

having a melting point of 72–73° C. was prepared from 2-piperidino - 4 - chloro - 6 - n-butyl-5,6,7,8-tetrahydro-pyrido-[4,3-d]-pyrimidine and N-methyl-piperazine.

EXAMPLE 62

Using a procedure analogous to that described in Example 2, 2-morpholino-4-(N'-methyl-piperazino)-6-n-butyl-5,6,7,8-tetrahydro-pyrido-[4,3-d]-pyrimidine of the formula

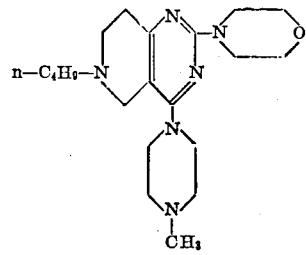

having a melting point of 97° C. was prepared from 2-morpholino - 4 - chlor-6 - n - butyl - 5,6,7,8 - tetrahydro-pyrido-[4,3-d]-pyrimidine and N-methyl-piperazine.

EXAMPLE 63

Using a procedure analogous to that described in Example 2, 2,4-bis-(N'-methyl-piperazino) - 6 - isobutyl-5,6,7,8-tetrahydro-pyrido-[4,3-d]-pyrimidine of the formula

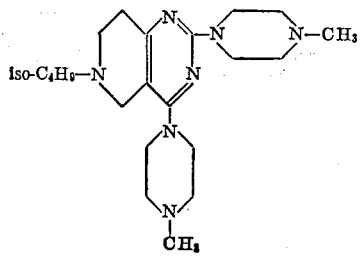

having a melting point of 84–85° C. was prepared from 2-(N'-methyl-piperazino)-4-chloro - 6 - isobutyl-5,6,7,8-tetrahydro-pyrido-[4,3-d]-pyrimidine and N-methyl-piperazine.

EXAMPLE 64

Using a procedure analogous to that described in Example 2, 2-pyrrolidino - 4 - (N'-methyl-piperazino) - 6 - isobutyl-5,6,7,8-tetrahydro-pyrido-[4,3-d]-pyrimidine of the formula

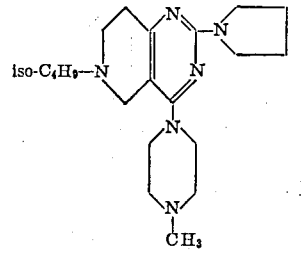

having a melting point of 70–71° C. was prepared from 2-pyrrolidino-4-chloro - 6 - isobutyl - 5,6,7,8 - tetrahydro-pyrido-[4,3-d]-pyrimidine and N-methyl-piperazine.

EXAMPLE 65

Using a procedure analogous to that described in Example 2, 2-morpholino-4-(N'-methyl-piperazino) - 6 - isobutyl-5,6,7,8-tetrahydro-pyrido-[4,3-d]-pyrimidine of the formula

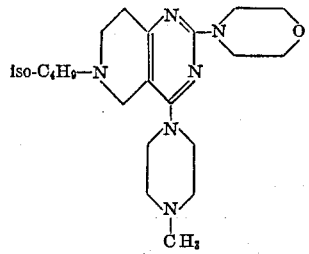

having a melting point of 149–150° C. was prepared from 2-morpholino-4-chloro - 6 - isobutyl - 5,6,7,8 - tetrahydro-pyrido-[4,3-d]-pyrimidine and N-methyl-piperazine.

EXAMPLE 66

Using a procedure analogous to that described in Example 2, 2,4-bis-(N'-methyl-piperazino)-6-phenyl-5,6,7,8-tetrahydro-pyrido-[4,3-d]-pyrimidine of the formula

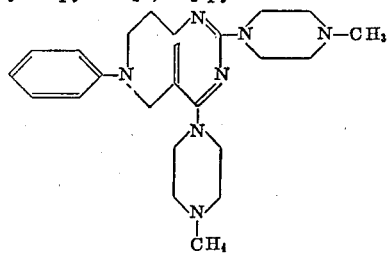

having a melting point of 139° C. was prepared from 2-(N'-methyl-piperazino)-4-chloro - 6 - phenyl - 5,6,7,8-tetrahydro-pyrido-[4,3-d]-pyrimidine and N-methyl piperazine.

EXAMPLE 67

Using a procedure analogous to that described in Example 2, 2-piperidino-4-(N'-methyl-piperazino)-6-phenyl-5,6,7,8-tetrahydro-pyrido-[4,3-d]-pyrimidine of the formula

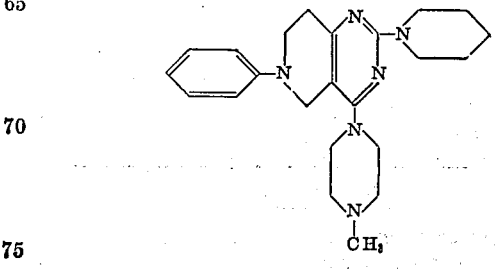

having a melting point of 132° C. was prepared from 2-piperidino-4-chloro-6-phenyl-5,6,7,8-tetrahydro - pyrido-[4,3-d]-pyrimidine and N-methyl-piperazine.

EXAMPLE 68

Using a procedure analogous to that described in Example 2, 2-morpholino-4 - (N' - methyl - piperazino) - 6-phenyl-5,6,7,8-tetrahydro-pyrido-[4,3 - d] - pyrimidine of the formula

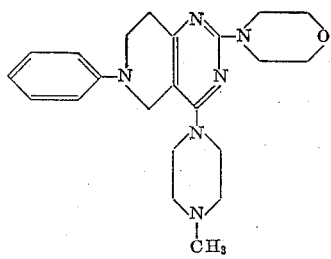

having a melting point of 149° C. was prepared from 2-morpholino-4-chloro-6-phenyl-5,6,7,8-tetrahydro - pyrido-[4,3-d]-pyrimidine and N-methyl-piperazine.

EXAMPLE 69

Using a procedure analogous to that described in Example 2, 2,4-bis-(N'-methyl-piperazino)-6-benzyl-5,6,7,8-tetrahydro-pyrido-[4,3-d]-pyrimidine of the formula

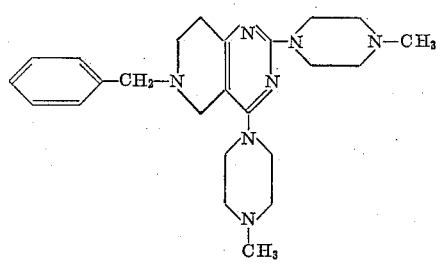

having a melting point of 118–120° C. was prepared from 2-(N'-methyl-piperazino)-4 - chloro - 6 - benzyl - 5,6,7,8-tetrahydro-pyrido-[4,3-d] - pyrimidine and N-methyl piperazine.

EXAMPLE 70

Using a procedure analogous to that described in Example 2, 2-pyrrolidino-4-(N'-methyl-piperazino)-6-benzyl-5,6,7,8-tetrahydro-pyrido-[4,3 - d] - pyrimidine of the formula

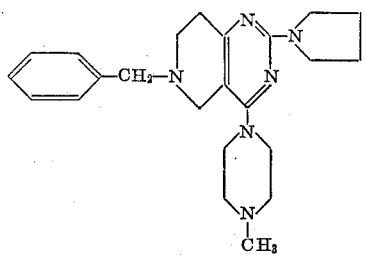

having a melting point of 127–128° C. was prepared from 2-pyrrolidino-4-chloro-6-benzyl - 5,6,7,8 - tetrahydro - pyrido-[4,3-d]-pyrimidine and N-methyl-piperazine.

EXAMPLE 71

Using a procedure analogous to that described in Example 2, 2-morpholino-4-(N'-methyl-piperazino)-6 - benzyl-5,6,7,8-tetrahydro-pyrido - [4,3-d] - pyrimidine of the formula

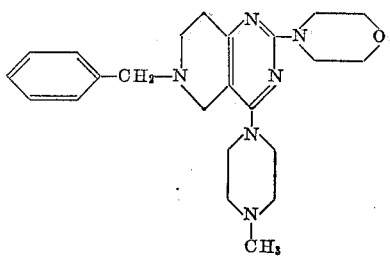

having a melting point of 164–165° C. was prepared from 2-morpholino-4-chloro-6-benzyl - 5,6,7,8 - tetrahydro - pyrido-[4,3-d]-pyrimidine and N-methyl-piperazine.

EXAMPLE 72

Using a procedure analogous to that described in Example 2, 2-morpholino - 4 - (N' - methyl - piperazino) - 6-(β-phenyl-ethyl)-5,6,7,8-tetrahydro-pyrido-[4,3-d] - pyrimidine of the formula

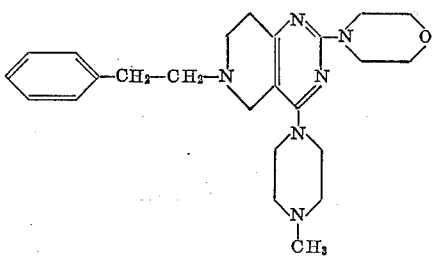

having a melting point of 122–124° C. was prepared from 2-morpholino-4-chloro-6-(β-phenyl)-ethyl) - 5,6,7,8 - tetrahydro-pyrido-[4,3-d] - pyrimidine and N -methyl - piperazine.

EXAMPLE 73

Using a procedure analogous to that described in Example 2, 2-amino-4-piperidino-6,8-dimethyl-5,6,7,8-tetrahydro-pyrido-[4,3-d]-pyrimidine of the formula

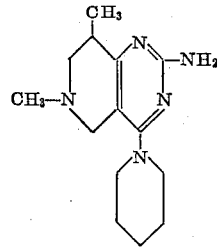

having a melting point of 117–118° C. was prepared from 2 - amino - 4 - chloro - 6,8 - dimethyl - 5,6,7,8 - tetrahydro-pyrido-[4,3-d]-pyrimidine and piperidine.

EXAMPLE 74

Using a procedure analogous to that described in Example 2, 2-n-butyl-4-piperidino-6-n-propyl-5,6,7,8-tetrahydro-pyrido-[4,3-d]-pyrimidine of the formula

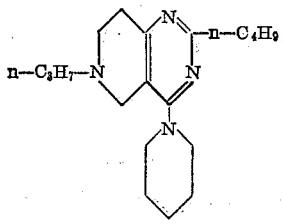

was prepared from 2-n-butyl-4-chloro-6-n-propyl-5,6,7,8-tetrahydro-pyrido-[4,3-d]-pyrimidine and piperidine. The dihydrochloride of the base had a melting point of 130° C.

EXAMPLE 75

Using a procedure analogous to that described in Example 2, 2-methyl-4-morpholino-6-allyl-5,6,7,8-tetrahydro-pyrido-[4,3-d]-pyrimidine of the formula

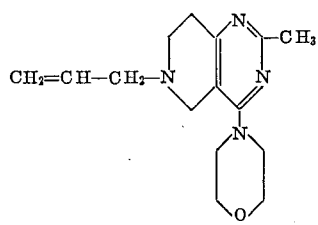

having a melting point of 99–100° C. was prepared from 2 - methyl - 4 - chloro - 6 - allyl - 5,6,7,8 - tetrahydro-pyrido-[4,3-d]-pyrimidine and morpholine.

EXAMPLE 76

Using a procedure analogous to that described in Example 2, 2-(di-n-butylamino)-4-n-hexylamino-6-isobutyl-5,6,7,8-tetrahydro-pyrido-[4,3-d]-pyrimidine of the formula

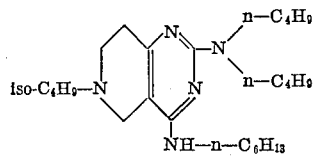

was prepared from 2-(di-n-butylamino)-4-chloro-6-isobutyl-5,6,7,8-tetrahydro-pyrido-[4,3-d]-pyrimidine and n-hexylamine. The mono-maleinate of the base had a melting point of 164–165° C.

EXAMPLE 77

Using a procedure analogous to that described in Example 2, 2-(di-n-butylamino)-4-pyrrolidino-6-n-propyl-5,6,7,8-tetrahydro-pyrido-[4,3-d]-pyrimidine of the formula

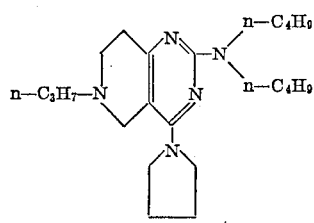

having a melting point of 70° C. was prepared from 2-(di - n - butylamino) - 4 - chloro - 6 - n - propyl - 5,6,7,8-tetrahydro-pyrido-[4,3-d]-pyrimidine and pyrrolidine.

EXAMPLE 78

Using a procedure analogous to that described in Example 2, 2-(di-n-butylamino)-4-pyrrolidino-6-n-butyl-5,6,7,8-tetrahydro-pyrido-[4,3-d]-pyrimidine of the formula

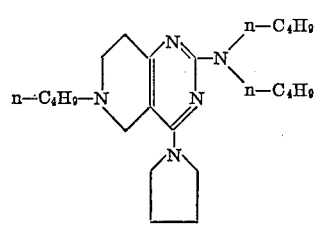

was prepared from 2-(di-n-butylamino)-4-chloro-6-n-butyl - 5,6,7,8-tetrahydro-pyrido-[4,3-d] - pyrimidine and pyrrolidine. The mono-maleinate of the base had a melting point of 154–155° C.

EXAMPLE 79

Using a procedure analogous to that described in Example 2, 2-(di-n-butylamino)-4-pyrrolidino-6-n-hexyl-5,6,7,8-tetrahydro-pyrido-[4,3-d]-pyrimidine of the formula

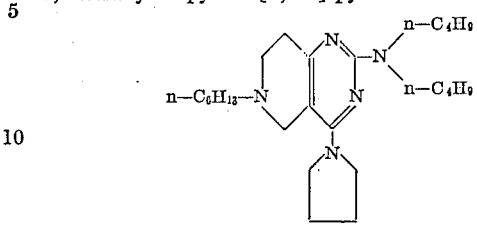

was prepared from 2-(di-n-butylamino)-4-chloro-6-n-hexyl - 5,6,7,8 - tetrahydro-pyrido-[4,3-d]-pyrimidine and pyrrolidine. The mono-maleinate of the base had a melting point of 148–149° C.

EXAMPLE 80

Using a procedure analogous to that described in Example 2, 2-(di-n-butylamino)-4-pyrrolidino-6-(β-phenylethyl)-5,6,7,8-tetrahydro-pyrido-[4,3-d]-pyrimidine of the formula

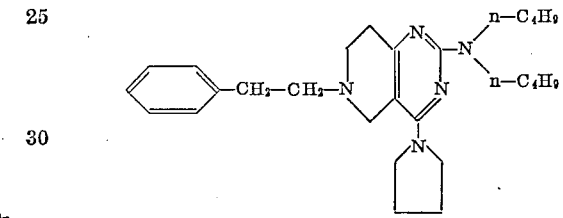

was prepared from 2-(di-n-butylamino)-4-chloro-6-(β-phenylethyl) - 5,6,7,8 - tetrahydro - pyrido - [4,3-d] - pyrimidine and pyrrolidine. The mono-maleinate of the base had a melting point of 143–144° C.

EXAMPLE 81

Using a procedure analogous to that described in Example 2, 2-(di-n-butylamino)-4-piperidino-6-n-butyl-5,6,7,8-tetrahydro-pyrido-[4,3-d]-pyrimidine of the formula

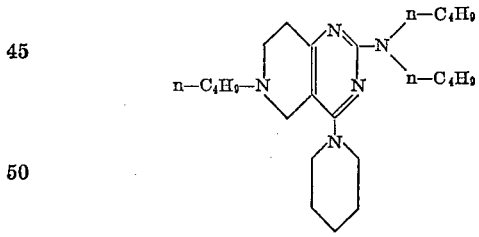

was prepared from 2-(di-n-butylamino)-4-chloro-6-n-butyl - 5,6,7,8 - tetrahydro - pyrido - [4,3-d] - pyrimidine and piperidine. The mono-maleinate of the base had a melting point of 165–166° C.

EXAMPLE 82

Using a procedure analogous to that described in Example 2, 2,4-dimorpholino-6-allyl-5,6,7,8-tetrahydro-pyrido[4,3-d]-pyrimidine of the formula

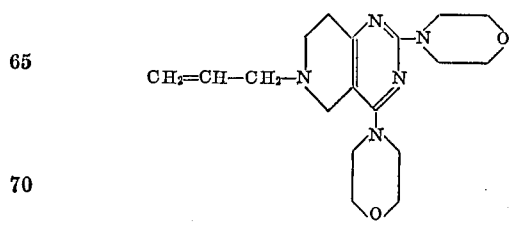

having a melting point of 121–122° C. was prepared from 2-morpholino-4-chloro-6-allyl-5,6,7,8 - tetrahydro-pyrido-[4,3-d]-pyrimidine and morpholine.

EXAMPLE 83

Using a procedure analogous to that described in Example 2, 2-dimenthylamino-4-pyrrolidino-6-allyl-5,6,7,8-tetrahydro-pyrido[4,3-d]-pyrimidine of the formula

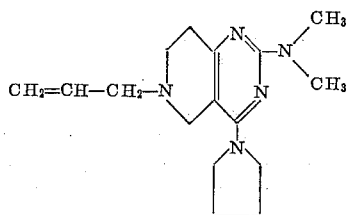

having a melting point of 99–100° C. was prepared from 2-di-methylamino - 4 - chloro - 6 -allyl-5,6,7,8-tetrahydropyrido-[4,3-d]-pyrimidine and pyrrolidine.

EXAMPLE 84

Using a procedure analogous to that described in Example 2, 2-dimethylamino-4-pyrrolidino-6-n-butyl-5,6,7,8-tetrahydro-pyrido-[4,3-d]-pyrimidine of the formula

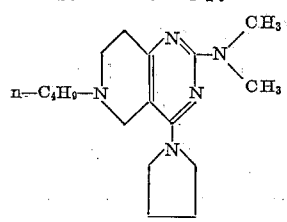

was prepared from 2-dimethylamino-4-chloro-6-n-butyl-5,6,7,8-tetrahydro-pyrido-[4,3-d]-pyrimidine and pyrrolidine. The mono-maleinate of the base had a melting point of 149–150° C.

EXAMPLE 85

Using a procedure analogous to that described in Example 2, 2-dimethylamino-4-piperidino-6-n-butyl-5,6,7,8-tetrahydro-pyrido-[4,3-d]-pyrimidine of the formula

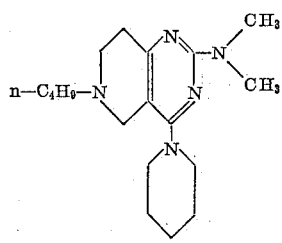

having a melting point of 72–73° C. was prepared from 2-dimethylamino - 4 - chloro - 6 - n-butyl - 5,6,7,8-tetrahydro-pyrido-[4,3-d]-pyrimidine and piperidine.

EXAMPLE 86

Using a procedure analogous to that described in Example 2, 2-(di-n-butylamino)-4-pyrrolidino-6-isobutyl-8-methyl-5,6,7,8-tetrahydro-pyrido-[4,3-d]-pyrimidine of the formula

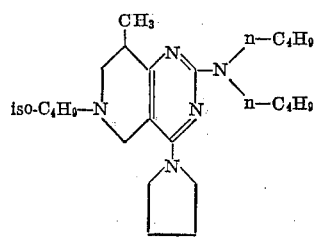

having a melting point of 53–55° C. was prepared from 2-(di-n-butylamino) - 4 - chloro - 6 - isobutyl-8-methyl-5,6,7,8-tetrahydro-pyrido[4,3-d]-pyrimidine and pyrrolidine.

EXAMPLE 87

Using a procedure analogous to that described in Example 2, 2-methyl-4-pyrrolidino-6-β-phenyl-ethyl)-5,6,7,8-tetrahydro-pyrido-[4,3-d]-pyrimidine of the formula

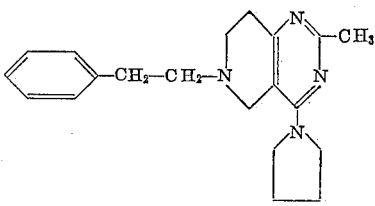

having a melting point of 119–121° C. was prepared from 2-methyl - 4 - chloro - 6 - (β-phenyl-ethyl)-5,6,7,8-tetrahydro-pyrido-[4,3-d]-pyrimidine and pyrrolidine.

EXAMPLE 88

Using a procedure analogous to that described in Example 2, 2-n-propyl-4-pyrrolidino-6-(β-phenyl-ethyl)-5,6,7,8-tetrahydro-pyrido-[4,3-d]-pyrimidine of the formula

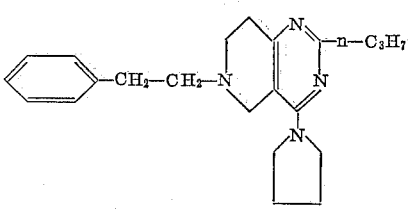

having a melting point of 92–94° C. was prepared from 2-n-propyl-4-chloro-6-(β - phenyl - ethyl)-5,6,7,8-tetrahydro-pyrido-[4,3-d]-pyrimidine and pyrrolidine.

EXAMPLE 89

Using a procedure analogous to that described in Example 2, 2-n-butyl-4-piperidino-6-(β-phenyl-ethyl)-5,6,7,8-tetrahydro-pyrido-[4,3-d]-pyrimidine of the formula

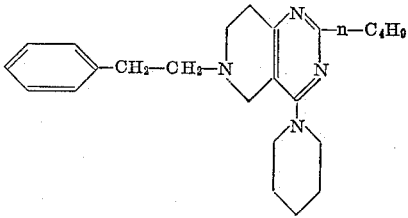

having a melting point of 85° C. was prepared from 2-n-butyl - 4 - chloro - 6 - (β-phenyl-ethyl)-5,6,7,8-tetrahydro-pyrido-[4,3-d]-pyrimidine and piperidine.

EXAMPLE 90

Using a procedure analogous to that described in Example 2, 2-dimethylamino-4-pyrrolidino-6-(β-phenyl-ethyl)-5,6,7,8-tetrahydro - pyrido-[4,3-d]-pyrimidine of the formula

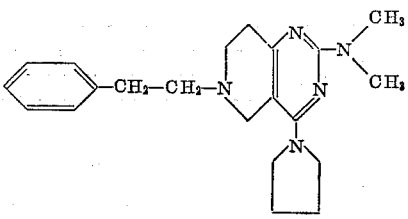

having a melting point of 112–114° C. was prepared from 2-dimethylamino - 4 - chloro - 6 - (β-phenyl-ethyl)-5,6,7,8-tetrahydro-pyrido-[4,3-d]-pyrimidine and pyrrolidine.

EXAMPLE 90a

*Preparation of 2,4-diamine-6-(β-phenyl-ethyl)-5,6,7,8-tetrahydro-pyrido-[4,3-a]-pyrimidine*

The solution of 2.3 gm. metallic sodium in 50 cc. of absolute ethanol was admixed with the solution of 9.6 gm. guanidine-hydrochloride in 100 cc. absolute ethanol. After standing for half an hour, the precipitated sodium chloride was filtered and the filtrate evaporated in a vacuum at room temperature. 1.5 gm. of 1-(β-phenyl-ethyl)-3-cyano-4-imino-piperidine (obtained by condensation of N[bis(β-cyanoethyl)-(β-phenyl-ethyl)]-amine, M.P. 142° C.) were given to the residue and the mixture heated to 140° C. for 2 hours. Thereafter, the reaction mixture was treated with 100 cc. of a 2-normal hydrochloric acid, the insoluble material was filtered and the filtrate made alkaline by addition of sodium hydroxide solution. The precipitated product was isolated by vacuum filtration and then recrystallized from methanol, yielding 0.7 gm. of the compound of the formula

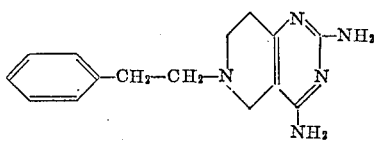

having a melting point of 183° C.

The compounds according to the present invention, that is, the tetrahydro-pyrido-[4,3-d]-pyrimidine substitution products embraced by Formula I and their non-toxic acid addition salts, have useful pharmacodynamic properties. More particularly, they exhibit antiphlogistic, antipyretic, diuretic, bacteriostatic, sedative and coronary dilating activities.

Non-toxic, pharmacologically acceptable acid addition salts of the compounds defined by Formula I include, but are not restricted to, those formed with hydrochloric acid, hydrobromic acid, sulfuric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid, 8-chlorotheophylline and the like.

For pharmacological purposes the compounds of the present invention are preferably incorporated as active ingredients into customary dosage unit compositions consisting essentially of an inert, physiologically compatible carrier having uniformly distributed therein one effective dosage unit of the active ingredient. One effective dosage unit of the compounds of the present invention is 20–300 mg., preferably 50–200 mg.

The following examples illustrate various dosage unit compositions containing a compound of the invention as the active ingredient. The parts are parts by weight unless otherwise specified.

EXAMPLE 91

*Coated pills.*—The pill core is compounded from the following ingredients:

| | Parts |
|---|---|
| 2 - (di - n - butylamino) - 4 - pyrrolidino - 6 - isobutyl - 5,6,7,8 - tetrahydro - pyrido - [4,3 - d]-pyrimidine | 100.0 |
| Calcium phosphate, secondary | 100.0 |
| Corn strach | 40.0 |
| Soluble starch | 8.0 |
| Magnesium stearate | 2.0 |
| | 250.0 |

*Compounding procedure*

The pyrido-pyrimidine compound, the calcium phosphate and the corn starch are admixed with each other, and the resulting mixture is granulated by moistening it with an aqueous 20% solution of the soluble starch, passing the moist mass through a 1.5 mm.-mesh screen and drying the moist granulate at 40° C. The dry granulate is again passed through the screen, the magnesium stearate is blended into the granulate and the resulting mixture is pressed into pill cores weighing 250 mg. each.

The pill cores thus obtained are coated with a thin shell consisting essentially of sugar and talcum, and the coated pills are polished with beeswax. Each coated pill weighs approximately 400 mg. and contains 100 mg. of the active ingredient.

EXAMPLE 92

*Wafer capsules.*—The contents of the capsules are compounded from the following ingredients:

| | Parts |
|---|---|
| 2 - (di - n - butylamino) - 4 - pyrrolidino - 6 - isobutyl - 5,6,7,8 - tetrahydro - pyrido - [4,3 - d]-pyrimidine | 50.0 |
| Lactose | 150.0 |

*Compounding procedure*

The pyrido-pyrimidine compound is passed through a 0.3 mm.-mesh screen and is then thoroughly admixed with the lactose. The resulting mixture is filled into wafer capsules holding each 200 mg. of the mixture. Each capsule contains 50 mg. of the active ingredient.

EXAMPLE 93

*Suppositories.*—The suppositories are compounded from the following ingredients:

| | Parts |
|---|---|
| 2 - (di - n - butylamino) - 4 - pyrrolidino - 6 - isobutyl - 5,6,7,8 - tetrahydro - pyrido - [4,3 - d]-pyrimidine | 200.0 |
| Suppository base (cocoa butter) | 1500.0 |
| Total | 1700.0 |

*Compounding procedure*

The suppository base is melted by heating it to about 40° C., whereupon the finely powdered pyrido-pyrimidine compound is stirred in. The resulting mixture is homogenized and is then poured at about 35° C. into cooled suppository molds holding 1700 mg. of the mixture. Each suppository contains 200 mg. of the active ingredient.

Obviously, the above dosage unit composition examples are merely illustrative of the various compositions which may be used to administer the compounds of the present invention. Those skilled in the art will readily understand that the particular tetrahydro-pyrido-pyrimidines in the above dosage unit composition examples may be replaced by any of the other compounds embraced by Formula I or their non-toxic, pharmacologically acceptable acid addition salts. Similarly, the amount of active ingredient in the examples may be varied within the dosage unit limits set forth above, depending upon particular requirements.

While the present invention has been illustrated with the aid of certain specific embodiments thereof, it will be readily apparent to others skilled in the art that the invention is not limited to these specific embodiments and that other changes and modifications may be made without departing from the spirit of the invention or the scope of the appended claims.

I claim:

1. A compound selected from the group consisting of 4-amino-5,6,7,8-tetrahydro-pyrido-[4,3-d]-pyrimidines of the formula

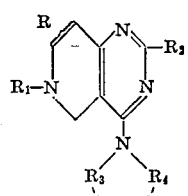

wherein R is selected from the group consisting of hydrogen and lower alkyl, $R_1$ is selected from the group consisting of lower alkyl, phenyl-lower alkyl, (di-lower alkyl-amino)-lower alkyl and lower alkenyl, $R_2$ is selected from the group consisting of lower alkyl, phenyl, phenyl-lower alkyl, amino, lower alkyl-amino, anilino, di-lower alkyl-amino, pyrrolidino, piperidino, morpholino and N'-lower alkyl-piperazino, $R_3$ is selected from the group consisting of hydrogen, lower alkyl and amino, $R_4$ is selected from the group consisting of hydrogen and lower alkyl, and $R_3$ and $R_4$, together with each other and the adjacent nitrogen atom, form a saturated basic heterocycle selected from the group consisting of pyrrolidino, piperidino, morpholino and N'-lower alkyl-piperazino, and their non-toxic, pharmacologically acceptable acid addition salts.

2. 2,4-dimorpholino-6-allyl - 5,6,7,8 - tetrahydropyrido-[4,3-d]-pyrimidine.

3. 2-(di-n-butylamino)-4-pyrrolidino-6-benzyl - 5,6,7,8-tetrahydro-pyrido-[4,3-d]-pyrimidine.

4. 2-dimethylamino-4-pyrrolidino-6-($\beta$ - phenyl-ethyl)-5,6,7,8-tetrahydro-pyrido-[4,3-d]-pyrimidine.

5. 2-phenyl-4-amino - 6 - ($\gamma$-diethylamino-n-propyl)-5,6,7,8-tetrahydro-pyrido-[4,3-d]-pyrimidine.

6. 2-(di-n-butylamino) - 4 - pyrrolidino-6-n-butyl-5,6,7,8-tetrahydro-pyrido-[4,3-d]-pyrimidine.

7. 2-(di-n-butylamino)-4-pyrrolidino - 6 - isobutyl-5,6,7,8-tetrahydro-pyrido-[4,3-d]-pyrimidine.

8. 2-(di-n-butylamino) - 4 - pyrrolidino-6-n-hexyl-5,6,7,8-tetrahydro-pyrido-[4,3-d]-pyrimidine.

9. The process of preparing a compound selected from the group consisting of 4-amino-5,6,7,8-tetrahydro-pyrido-[4,3-d]-pyrimidine substitution products of the formula

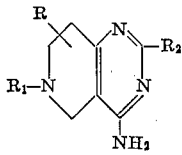

wherein R is selected from the group consisting of hydrogen and lower alkyl, $R_1$ is selected from the group consisting of lower alkyl, phenyl-lower alkyl, (di-lower alkyl-amino)-lower alkyl and lower alkenyl, $R_2$ is selected from the group consisting of lower alkyl, phenyl, phenyl-lower alkyl, amino, lower alkyl-amino, anilino, di-lower alkyl-amino, pyrrolidino, piperidino, morpholino and N'-lower alkyl-piperazino, which comprises reacting a 3-cyano-piperidine of the formula

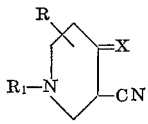

wherein R and $R_1$ have the meanings defined above, and

X is selected from the group consisting of oxygen and imino, with an amidine compound selected from the group consisting of amidines of the formula

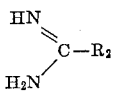

wherein $R_2$ has the meanings defined above, and acid addition salts thereof, at a temperature between room temperature and 150° C. in the presence of an alkaline condensation agent and of an inert solvent, and recovering the reaction product.

References Cited by the Examiner
UNITED STATES PATENTS

| | | | |
|---|---|---|---|
| 2,697,710 | 12/1954 | Hitchings et al. | 260—256.4 |
| 2,890,152 | 6/1959 | Babcock et al. | 167—65 |
| 2,926,166 | 2/1960 | Hitchings et al. | 260—256.4 |
| 2,994,640 | 8/1961 | Zellner | 167—65 |

OTHER REFERENCES

Cook et al.: Jour. Chem. Soc. (London), 1956, pages 399–402.

NICHOLAS S. RIZZO, *Primary Examiner.*

HENRY R. JILES, *Examiner.*